C. W. RHODES.
AUTOMATIC AIR BRAKE HOSE COUPLING.
APPLICATION FILED MAY 12, 1908.
905,582.
Patented Dec. 1, 1908.
3 SHEETS—SHEET 1.
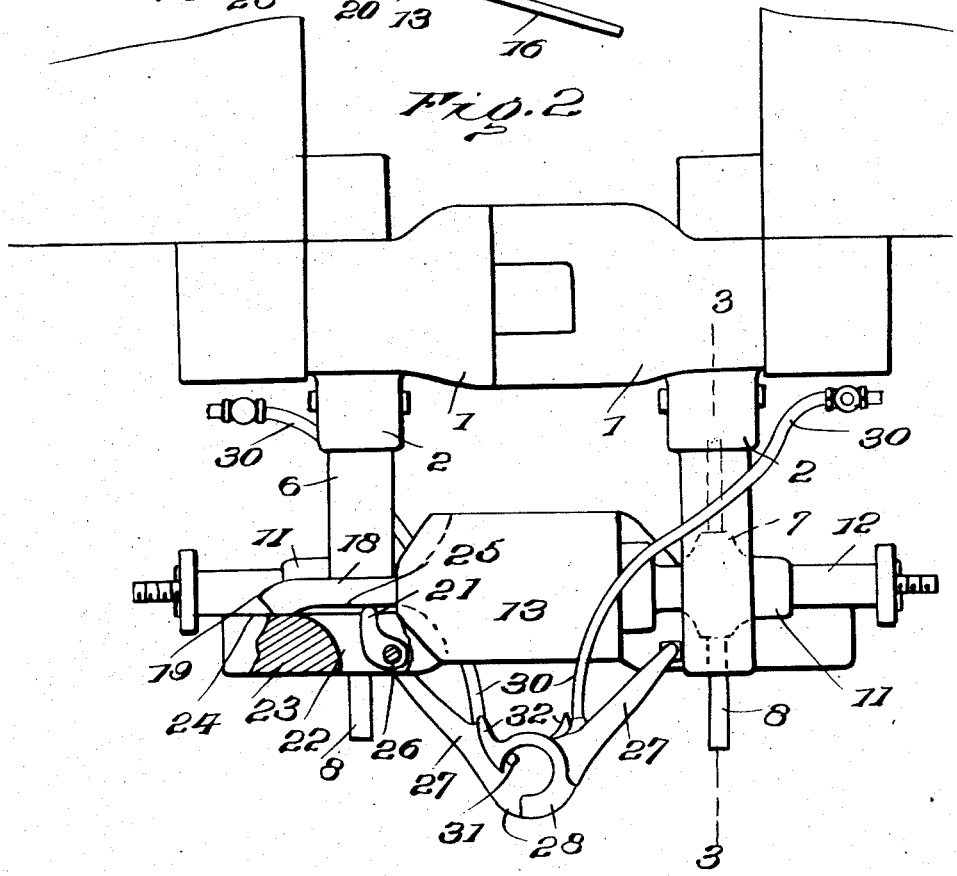

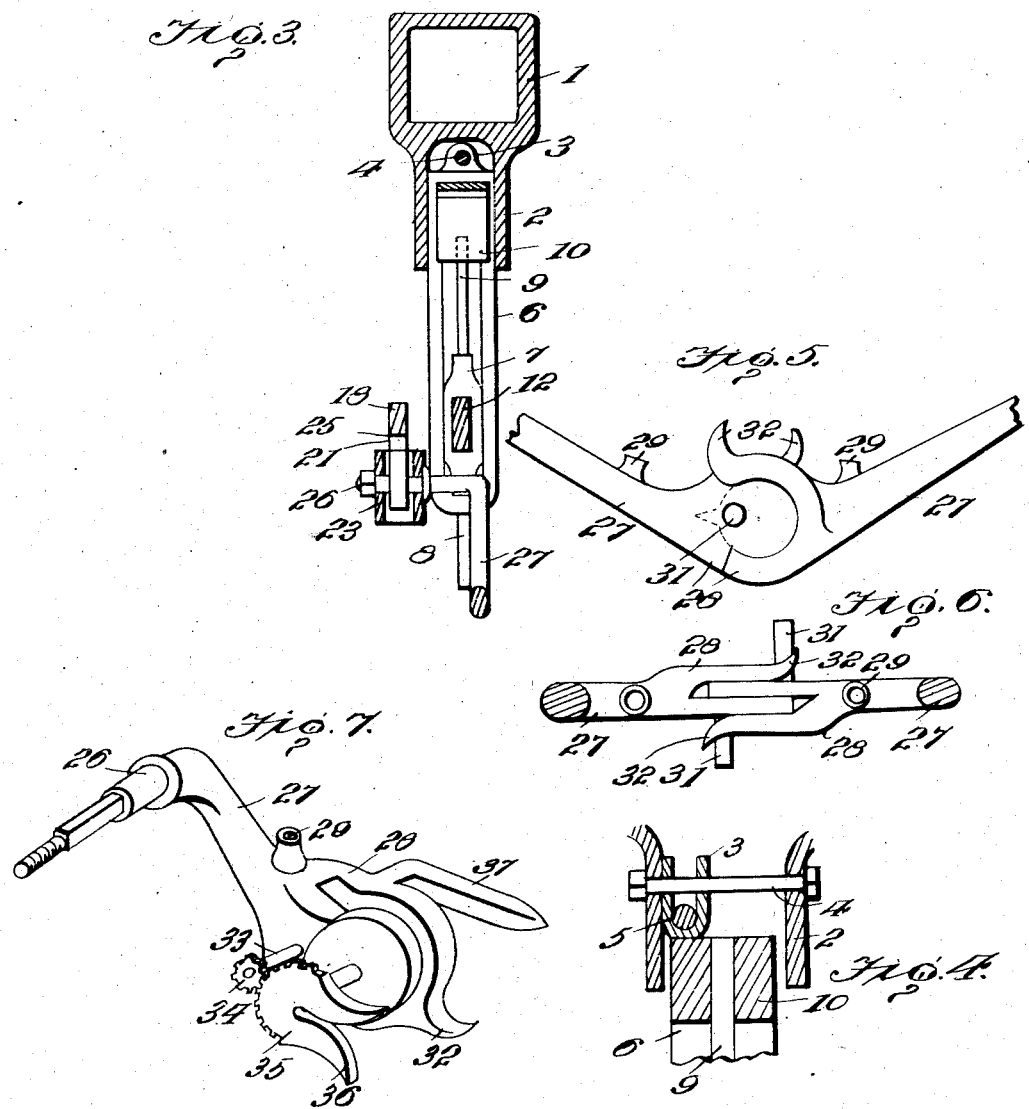

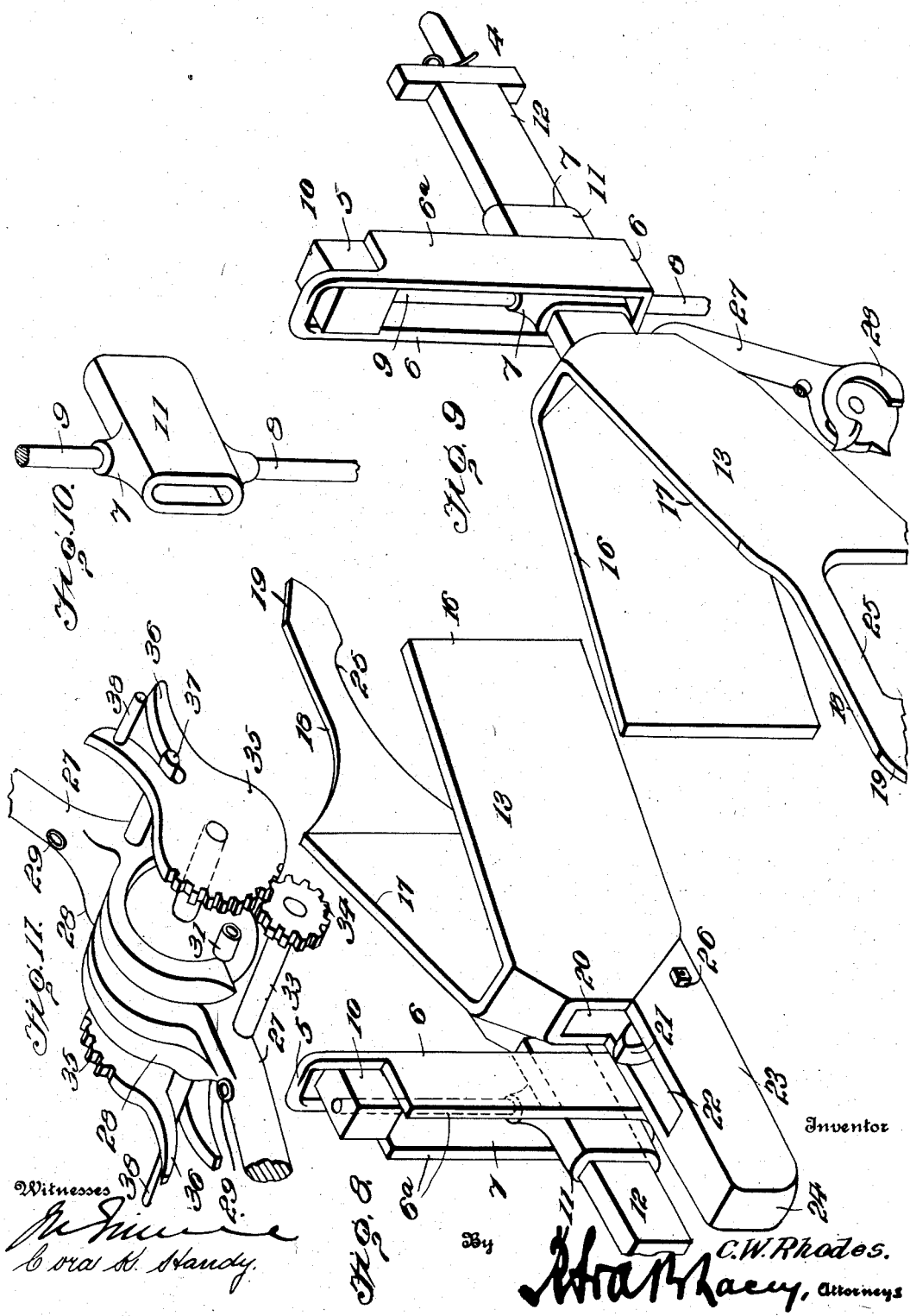

UNITED STATES PATENT OFFICE.

CHARLIE W. RHODES, OF BUENA VISTA, VIRGINIA, ASSIGNOR OF ONE-HALF TO HENRY G. ELLIOTT, OF BUENA VISTA, VIRGINIA.

AUTOMATIC AIR-BRAKE HOSE-COUPLING.

No. 905,582.   Specification of Letters Patent.   Patented Dec. 1, 1908.

Application filed May 12, 1908. Serial No. 432,443.

*To all whom it may concern:*

Be it known that I, CHARLIE W. RHODES, a citizen of the United States, residing at Buena Vista, in the county of Rockbridge and State of Virginia, have invented certain new and useful Improvements in Automatic Air-Brake Hose-Couplers, of which the following is a specification.

This invention comprehends certain new and useful improvements in automatic air brake hose couplers, and the invention has for its primary object a simple durable and efficient construction of a mechanism arranged to automatically couple the train pipe hose connections of two cars when the same are brought together for coupling, whether on a straight track or a curve, the parts being so arranged that the coupling of the train pipe hose will be positively effected and the parts properly guided towards each other for such positive action. And a further object of the invention is, in addition to the coupling mechanism, an improved automatic means for opening the cocks in the couplers simultaneously with the joining thereof.

With these and other objects in view, as will more fully appear as the description proceeds, the invention consists in certain constructions, arrangements and combinations of parts that I shall hereinafter fully describe and then point out the novel features in the appended claims.

For a full understanding of the invention, reference is to be had to the following description and accompanying drawings in which:

Figure 1 is a top plan view, with parts in section of my improved automatic air brake hose coupler; Fig. 2 is a side elevation thereof, with a part in section; Fig. 3 is a transverse sectional view on the line 3—3 of Fig. 2; Fig. 4 is a detail view of a portion of one coupler; Fig. 5 is a side elevation of two members of a coupling shown connected together; Fig. 6 is a top plan view thereof; Fig. 7 is a detail perspective view of a coupling member arranged for the automatic actuation of the cock thereof upon the joining of two such members; Fig. 8 is a detail perspective view on an enlarged scale of one of the scoops employed and its concomitant parts; Fig. 9 is a similar view of a complemental scoop; Fig. 10 is a detail perspective view of one of the vertically movable scoops; and, Fig. 11 is a perspective view of two couplers connected together, said couplers embodying the means for automatically opening the couplers to the train pipe air when the couplers are connected.

Corresponding and like parts are referred to in the following description and indicated in all the views of the drawings by the same reference characters.

In carrying out my invention, I apply to the car couplers 1 that may be of any of the accepted or conventional types, depending hoods 2 secured to the car couplers in any desired way. In each hood is a U-shaped buckle or stirrup 3 which is held therein by means of a bolt 4 extending therethrough and longitudinally through the hood, as best seen in Figs. 2, 3 and 4. The stirrup 3 embraces and thereby supports the cross-bar of a yoke 5 which is formed on the upper end of a frame like hanger 6. A vertically movable scoop support 7 is provided with lower and upper rod like arms designated 8 and 9 respectively, the lower arm extending therefrom through an opening formed in the bottom of the suspension frame or hanger 6 and movable freely therein and the upper arm 9 being movable freely through a block 10 which is inserted in the hood in the upper part of the hanger. By this means, it will be understood that the hanger 6 is suspended in the hood 2 underneath the car coupler 1 and that the scoop carrying member or holder 7, is mounted for a limited up and down movement in the hanger 6, as well as for a limited rotary or sidewise movement therein, the sidewise movements being limited by means of wings 6ª which project rearwardly from the hanger 6, as clearly illustrated in the drawings. Each of these vertically and rotatably movable scoop holders 7 is horizontally elongated as indicated at 11 in Figs. 9 and 10 and in such portion of the scoop holder is formed a horizontally extending opening extending entirely therethrough and designed to receive with a horizontally guiding movement the stem 12 of a scoop 13. There are two of these scoops, as shown arranged to coact with each other and guide the parts properly together when two cars are brought together to be coupled. The longitudinal movement of the scoop in its holder is limited in one direction by means of nuts or washers 14 preferably screwed on the rear reduced extremity of the stem 12 and locked thereon by means of a cotter pin as shown, and in another direction by means of a collar 15 secured to the front end of the elongated or body portion 11 of the holder 7.

Each scoop 13 is formed with diverging members 16 and 17 designed to effect the proper alinement of parts no matter whether the cars be on a straight track or on a curve, the engaged positions of the scoops being illustrated best in Fig. 1. The member 17 of each scoop is formed with a forwardly projecting tongue 18 the extremity of which is pointed as indicated at 19 and which is designed to pass through an opening 20 formed in the rear end of the opposing or coacting scoop. The pointed extremity 19 of each tongue 18 as it passes through the opening 20 in the complemental scoop rides upon and rocks a lever 21 which is fulcrumed in a chamber 22 formed in the rearwardly projecting arm 23 of the scoop as best indicated in Fig. 8. After the extremity of the tongue 18 has passed the lever 21, such extremity rides upon the plane surface 24 of the arm 23, while the lever 21 is permitted to resume its normal position, owing to a recess 25 formed in the lower edge of the tongue.

The lever 21 is fulcrumed in a square portion of a shaft 26 which is journaled in the arm 23 and which is best shown in detail or detached in Fig. 7. The shaft 26 is formed with an angularly disposed arm 27 upon the free or lower end of which is formed a coupler member 28. Each of these coupler members is provided with a nipple 29 arranged to receive the end of a hose 30 leading from the train pipe, as best seen in Figs. 5, 6 and 7. Each coupler member 28 is formed with a pin 31 and with a curved finger 32 designed to ride upon the pin of the complemental member, so as to insure the proper mating of these parts when brought together.

In the practical operation of so much of my invention as has been hereinbefore described, it will be understood that when two cars are brought together to be coupled the scoops 13 will be guided one within the other, with the arms 27 hanging freely down. As the tongues 18 pass through the openings 20 in the scoops and ride upon the levers 21, such levers will obviously be rocked and the arms 27 will be raised as they come together so as to properly guide the two coupler members 28 into engagement with each other. After the engagement has been effected, the continued movement of the tongues 18 will bring their recesses 25 in registry with the upper ends of the levers 21, and said levers will be permitted to rock back to their original positions, which will consequently permit the two engaged coupler members 28 to rock upon each other so as to effect a firm locking engagement of the parts by their engaging surfaces. It will thus be seen that in the operation of automatically coupling the two coupler members 28, as the cars are coupled together, said coupler members 28 are brought together in relatively raised positions and after the engagement are permitted by their own weight to drop or lower so as to effect a firm locking connection with each other.

In addition to the means for automatically coupling up the hose connections of the train pipe as the cars are brought together, my invention comprehends means for automatically opening the cocks of the coupler members 28 when the cars are coupled and to this end I provide each coupler member 28 with an extended stem 33 of its angle cock or valve. On the stem 33 a pinion 34 is mounted. A toothed segment 35 mounted for a partial rotary movement on the coupler member 28 and projecting out to one side thereof, has its teeth mesh with the teeth of the pinion 35 and is formed at one end with a fork 36 the members of which diverge as is best seen in Fig. 7. Each coupler member is formed at one side with a pinion 37 and when the two coupler members are brought together the pinion 37 of one of them will enter into the fork 36 of the other so that the subsequent lowering movement of the coupler members after they have become engaged with each other will effect the turning of the segment 35 and the consequent turning of the pinion 34 and the valve stem 33 so as to open the valve and establish communication between the train pipe of one car and the train pipe of the adjoining car.

38 designates pins that project outwardly from the forked ends of the toothed segments 35 and that are designed to strike against the corresponding scoops in case of accidental movement of the segment when the couplers are not connected.

Fig. 11 illustrates the positions of the two couplers after they have been connected together. From this view it will be understood that the pins 37 enter the forks 36 of the other couplers when the couplers are connected, the ends of the respective couplers riding over the pins 31 of the other coupler, and then after the couplers are permitted to lower by their own weight, supplemented by the air pressure that is being turned on by the lowering motion and the pin 31 will ride up into the curved portions of the respective couplers, and the two will be securely wedged together while at the same time, the lowering motion will turn the segments 35 so as to fully open the couplers to the air pressure.

When the cars are uncoupled, the scoop holders 11 will manifestly move away from each other until they abut against the nuts on the rear ends of the stems 12 of the scoops 13, whereupon the arms 27 will be raised from their angular relation to each other as illustrated in Fig. 2, and assume a position substantially in alinement with each other, this rocking of the arms 27 effecting the uncoupling of the members 28. When the arms 27 are substantially in a straight line with each other the tongues 19 of the respective scoops will be resting upon the levers 21 and, after the tongues have passed the levers 21, the uncoupled coupler members 28 will fall downwardly again. During the movement just described, of the arms 27 and coupler members 28, the toothed scoops above described will automatically cut off the air passage (it being understood that these scoops shut off the air when the couplers are raised and turn it on when they go down) and when the arms 27 are in line with each other and ready to separate, the toothed scoop stays in position and the coupler rod and coupler together with the stiffness of the hose makes the arms 27 drop back to their lower inclined positions, with the couplers unhinged.

It will be clear from the foregoing description, in connection with the accompanying drawings, that my improved form of coupler may be used with any other standard equipment, as the parts of my invention are not so materially altered from the standard form of hose coupler as to render its adaptation impractical.

Having thus described the invention, what is claimed as new is:

1. In mechanism of the character described, the combination of two coupler members, arms carrying the same, scoops by which said arms are supported for vertical movement, means for supporting said scoops, means carried by each scoop for effecting the raising of the opposite arm whereby to bring the coupler members together in raised positions, and means for subsequently permitting said coupler members to lower as and for the purpose set forth.

2. In mechanism of the character described, the combination of two mating coupler members, arms carrying the same, scoops by which said arms are supported for a vertical movement, and levers fulcrumed in the scoops and operatively connected to the arms, each scoop being provided with a tongue arranged for engagement with the lever of the opposing scoop as and for the purpose set forth.

3. In mechanism of the character described, the combination of two mating coupler members, arms carrying the same, scoops by which said arms are supported for a limited movement, levers fulcrumed in the scoops and operatively connected to said arms to move same, and tongues secured to the respective scoops and each arranged to rock the lever of the opposing scoop, each tongue being formed with a recess designed to permit the levers to rock back to their initial positions after actuation.

4. In mechanism of the character described, the combination of two mating coupler members, vertically swinging arms carrying the same, scoops arranged to guide the arms towards each other and supporting said arms, levers fulcrumed in the scoops, the scoops being provided with openings, means for supporting said scoops, and tongues secured to the respective scoops, each tongue being designed to pass through the opening of the opposing scoop into operative engagement with the lever thereof.

5. In mechanism of the character described, the combination of two mating coupler members, vertically swinging arms carrying the same, scoops arranged for engagement with each other and adapted to guide the arms towards each other, each scoop being provided with a rearwardly extending arm, said arm being formed with a chamber and the scoop being formed with an opening communicating with said chamber, levers fulcrumed in said chambers, the arms being pivotally mounted in said chambers and operatively connected to said levers, and tongues secured to the respective scoops, each tongue being designed to pass through the opening of the opposing scoop into rocking engagement with the lever thereof.

6. In mechanism of the character described, the combination of mating coupler members, scoops from which said members are suspended and by which they are arranged to be brought into engagement with each other, said scoops being respectively provided with rearwardly extending stems, scoop holders in which said stems are mounted for a longitudinal movement, and hangers in which the holders are mounted to turn laterally.

7. In mechanism of the character described, the combination of mating coupler members, scoops from which said members are suspended and by which they are arranged to be brought into engagement with each other, said scoops being respectively provided with rearwardly extending stems, scoop holders in which said stems are mounted for a longitudinal movement, and hangers in which said holders are mounted for a free vertical movement.

8. In mechanism of the character described, the combination of mating coupler members, scoops from which said members are suspended and by which they are arranged to be brought into locking engagement with each other, said scoops being respectively provided with rearwardly projecting stems, scoop holders in which said stems are mounted for a longitudinal movement, and hangers in which said holders are mounted for both a laterally turning and vertical movement.

9. In mechanism of the character described, the combination of mating coupler members, scoops by which said members are suspended and by which they are adapted to be brought into locking engagement with each other, said scoops being respectively provided with rearwardly projecting stems, scoop holders in which said stems are mounted for longitudinal movement, said holders being provided with upwardly and downwardly extending arms, and suspension hangers in which said holders are mounted, the arms of the holders being connected for a turning and upward and downward movement in the respective hangers.

10. In mechanism of the character described, the combination of hoods, suspension hangers, having their upper ends mounted in said hoods, and formed at such upper ends with yokes, stirrups secured in said hoods and engaging said yokes to suspend the hangers therefrom, scoop holders mounted in said hangers, scoops supported by said holders, and coupler members suspended from said scoops and adapted to be brought thereby into locking engagement with each other.

11. In mechanism of the character described, the combination of two coupler members, means for automatically bringing said members together into abutting relation with each other and for subsequently moving said couplers vertically whereby to effect a turning movement of one with respect to the other, and means for automatically opening said couplers for the passage of the train pipe air by and upon the vertical movement thereof.

12. In mechanism of the character described, the combination of two coupler members provided with valves, and with projecting valve stems, means for automatically bringing said couplers together into abutting relation with each other and for subsequently effecting a turning movement of one coupler with respect to the other, and means for turning said valves to the open position by and upon said turning movement, said valve opening means being connected with the projecting ends of the valve stems.

13. In mechanism of the character described, the combination of coupler members, means for automatically bringing said coupler members together into abutting relation with each other and for subsequently effecting a turning movement of one coupler relative to the other, said couplers being respectively provided with valves with projecting valve stems, pinions mounted on the ends of said stems, toothed segments carried by the coupler members and meshing with the respective pinions, said segments being formed with forked ends, and pins carried by the coupler members and designed to enter the forked ends of the segments of the opposing coupler and engage therewith, as and for the purpose set forth.

In testimony whereof I affix my signature in presence of two witnesses.

CHARLIE W. RHODES. [L.S.]

Witnesses:
  A. O. BURKS,
  T. F. AMOLE.